T. J. REED.
NON-SKID TIRE PROTECTOR.
APPLICATION FILED AUG. 23, 1916.
1,244,080. Patented Oct. 23, 1917.
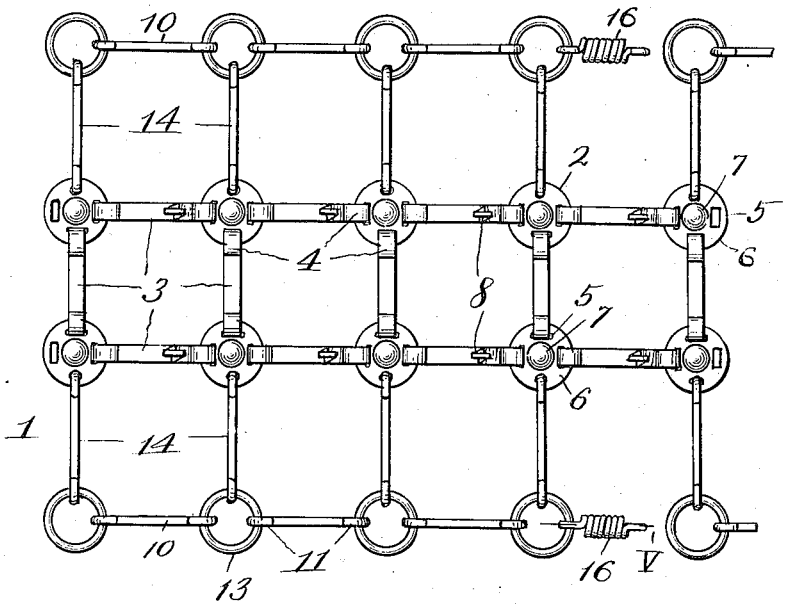
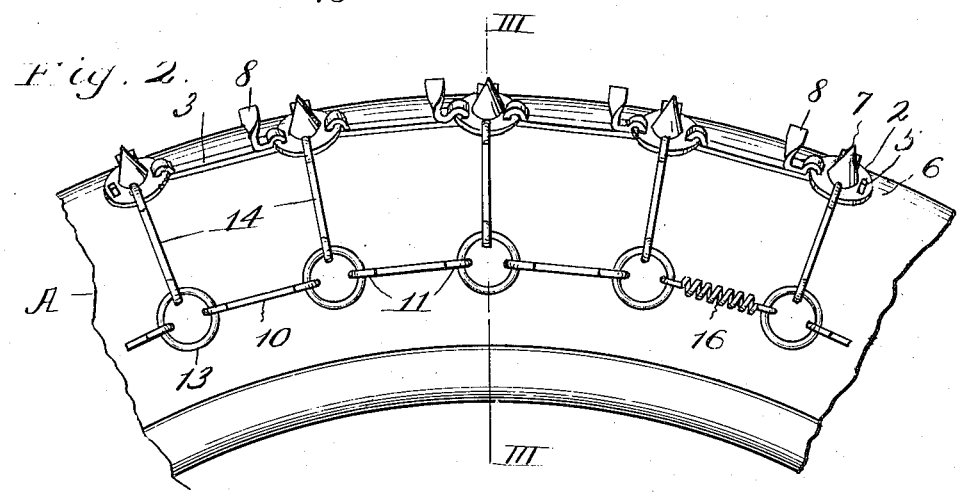
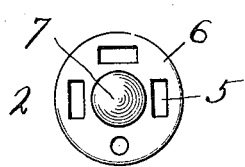
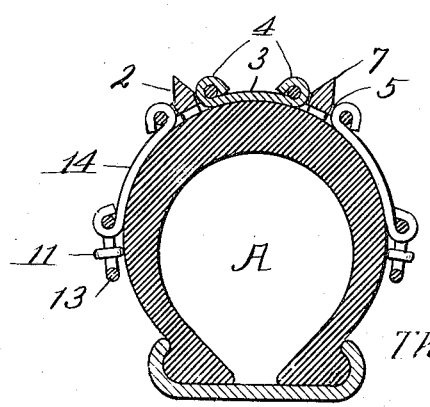
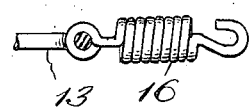
Witness:
R. Hamilton
L. J. Fischer
Inventor,
Theodore J. Reed
By F. G. Fischer, atty

UNITED STATES PATENT OFFICE.

THEODORE J. REED, OF KANSAS CITY, MISSOURI.

NON-SKID TIRE-PROTECTOR.

1,244,080.   Specification of Letters Patent.   Patented Oct. 23, 1917.

Application filed August 23, 1916. Serial No. 116,437.

*To all whom it may concern:*

Be it known that I, THEODORE J. REED, a citizen of the United States, residing at Kansas City, in the county of Jackson and State of Missouri, have invented certain new and useful Improvements in Non-Skid Tire-Protectors, of which the following is a specification.

My invention relates to nonskid tire protectors, and more particularly to one adapted to be used upon a pneumatic tire for preventing the same from slipping either longitudinally or laterally of the road.

The objects of the invention are to provide a simple and practical antiskidding attachment which will protect the tire from wear incident to its use on rough roads, which will be comparatively light and inexpensive in construction but sufficiently strong and durable to accomplish the purposes intended, and in which any of the parts can be readily replaced when worn out.

Other objects of the invention will hereinafter appear, and in order that said invention may be fully understood, reference will now be made to the accompanying drawing, in which:

Figure 1 is a broken plan view of the device.

Fig. 2 is a broken side elevation of a tire with a portion of the device in position thereon.

Fig. 3 is a cross section on line III—III of Fig. 2.

Fig. 4 is a plan view of a member constituting a portion of the device.

Fig. 5 is an enlarged detail view of the resilient hook employed in securing the device in position upon a tire.

Referring more particularly to the drawings, A designates a portion of a pneumatic tire.

1 designates my device, the tread portion of which comprises members 2 and rectangular bars 3, which latter are arranged in the form of hollow squares and have loops 4 to extend through openings 5 in the marginal flanges 6 of the members 2, which have centrally-disposed conical spurs 7 to prevent the tire from skidding in any direction.

The spurs 7 are aided in preventing the tire from skidding by chisel-like edges 8, one of which is, preferably, formed on an outturned end of each bar 3 and extends longitudinally of the bar or strip 3. These strips 3 are of uniform thickness throughout and have each of their ends curled inwardly.

10 designates the side bars of the device, which have loop terminals 11 connected to circular links 13, connected by transverse bars 14 to the adjacent members 2. The transverse bars 14 and the side bars 10 are, preferably, circular in cross section and said transverse bars 14 and the transverse bars 3 are curved as disclosed by Fig. 3, to conform to the cross sectional curvature of the tire A. As the bars 10 and 14 are not subjected to the wear of the tread bars 3, they are constructed of lighter material than said tread bars.

In order that the device may be readily applied to and removed from the tire, resilient hooks 16 are employed which replace two or more of the side bars 10 and are arranged to engage two adjacent links 13. When each of the hooks 16 is disengaged from a link 13, sufficient slack is afforded in the sides of the device to enable it to be readily applied to or removed from the tire A. When the device is applied to the tire and the resilient hooks are engaged in the adjacent links 13, said hooks take up practically all slack and prevent the device from slipping upon and injuring the tire.

From the foregoing description, it will be readily understood that the invention provides an extremely simple and comparatively inexpensive attachment, the parts of which are so constructed that they will not injure the tire in any way and can be readily disengaged and assembled. The detachable connections of the several parts permit any of said parts to be replaced when worn, and the open construction of the tread bars and the provision of the spurs 7 and the chisel-like edges 8, effectively prevent slipping of the tire in any direction upon the road.

While I have shown and described the preferred form of my invention, I do not limit myself to the exact construction disclosed by the drawing, but reserve the right to make such changes as properly fall within the spirit and scope of the claims.

Having thus described my invention, what I claim and desire to secure by Letters Patent, is:

1. In a non-skidding tire attachment, spaced spur-bearing members having slots, bars having loops at each of their ends engaged in the slots to connect said members, one of the ends of one of the loops of the bars being extended outwardly and shaped to form a calk the edge of which latter extends substantially longitudinally of the bar, and means to secure said parts in position on the tire casing.

2. In a non-skidding tire attachment, spaced members having openings, metal strips of substantially uniform thickness throughout connecting said members, each of said strips having each end curled over and inwardly to form loops engaging in the openings of the adjacent members, the inner end of one of the loops being extended outwardly and sharpened at its extreme free edge to form a calk.

In testimony whereof I affix my signature, in the presence of two witnesses.

THEODORE J. REED.

Witnesses:
F. G. FISCHER,
L. J. FISCHER.